(12) United States Patent
Smith

(10) Patent No.: US 6,616,337 B1
(45) Date of Patent: Sep. 9, 2003

(54) NOISE-REDUCING MACHINE COMPONENT

(75) Inventor: Bevan V. Smith, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/086,038

(22) Filed: Feb. 28, 2002

(51) Int. Cl.$^7$ .......................... F16C 19/54; F16H 55/14
(52) U.S. Cl. ........................ 384/476; 324/627; 74/443
(58) Field of Search .................. 384/476, 535, 384/581, 627; 74/443, 439, 446, DIG. 10

(56) References Cited

U.S. PATENT DOCUMENTS

| | | |
|---|---|---|
| 1,579,798 A | 4/1926 | Vail |
| 1,965,293 A * | 7/1934 | Ljungstrom ................. 384/535 |
| 2,062,290 A | 12/1936 | Bott |
| 2,141,122 A | 12/1938 | Boden |
| 2,244,197 A | 6/1941 | Hessler |
| 3,698,777 A | 10/1972 | McCoy |
| 4,244,439 A | 1/1981 | Wested |
| 5,044,784 A | 9/1991 | Lisowsky |
| 5,044,785 A | 9/1991 | Bair et al. |
| 5,044,789 A * | 9/1991 | Damon et al. ............. 384/581 |
| 5,078,510 A | 1/1992 | Bair et al. |
| 5,092,192 A * | 3/1992 | Pelzer ......................... 74/443 |
| 5,657,666 A * | 8/1997 | Tsuda et al. ................ 74/443 |
| 6,203,441 B1 | 3/2001 | Iarrera |
| 6,264,370 B1 * | 7/2001 | Kramer et al. ............. 384/536 |
| 6,536,953 B1 * | 3/2003 | Cope et al. ................ 384/536 |

FOREIGN PATENT DOCUMENTS

| | | |
|---|---|---|
| EP | 0287309 | 10/1988 |
| FR | 2144479 | 2/1973 |
| JP | 120670 | 4/2000 |

\* cited by examiner

*Primary Examiner*—Thomas R. Hannon
(74) *Attorney, Agent, or Firm*—Polster, Lieder, Woodruff & Lucchesi, L.C.

(57) ABSTRACT

A machine component, which may be a race of an antifriction bearing, contains pockets, the borders of which is defined by side-by-side reflecting surfaces which have free boundaries and intersect at alternating peaks and valleys. Vibration or noise to which the machine component is subjected produces mechanical longitudinal and transverse waves which propagate through the machine component, with the longitudinal waves being more intense and less subjected to attenuation. Some of the longitudinal waves encounter the reflecting surfaces which partially convert them into transverse waves, and the transverse waves rapidly attenuate in the machine component itself. Thus, the pockets reduce noise in the machine component.

25 Claims, 4 Drawing Sheets

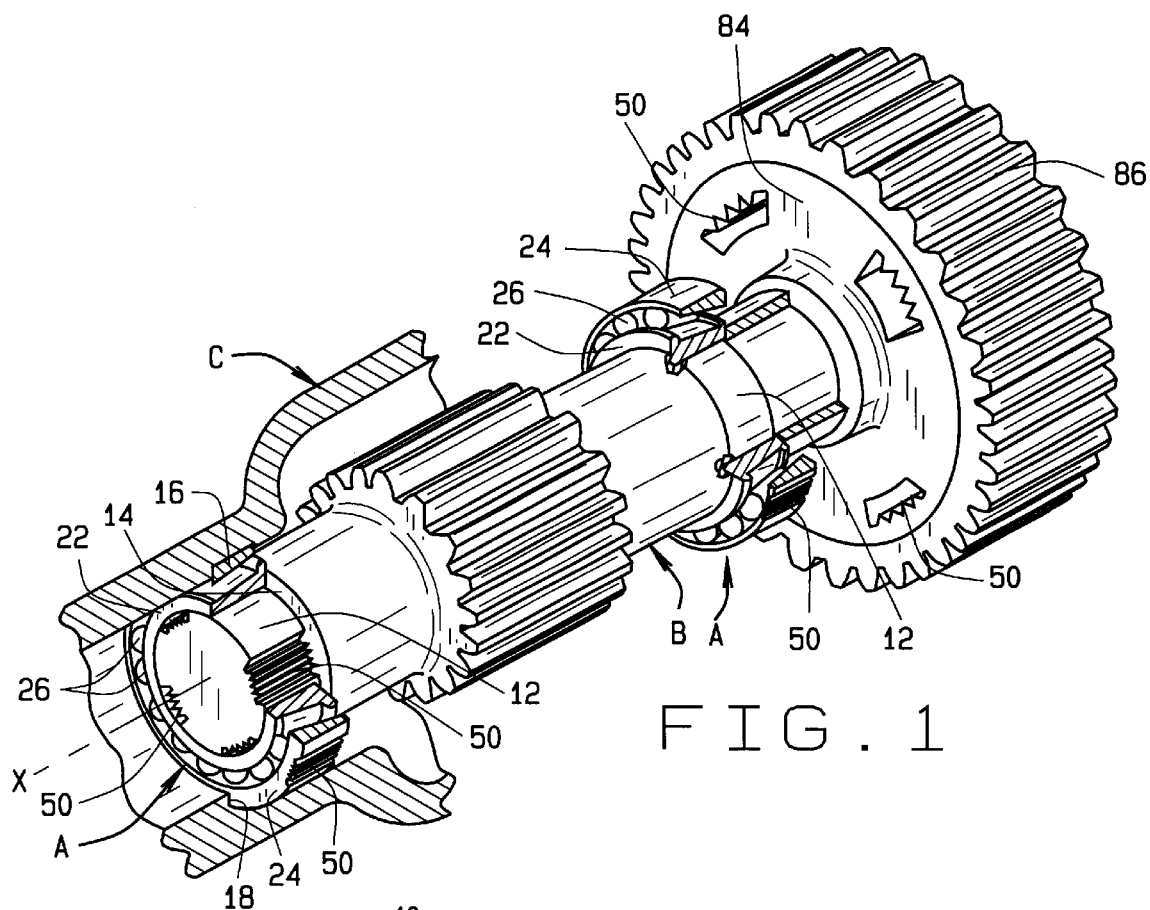
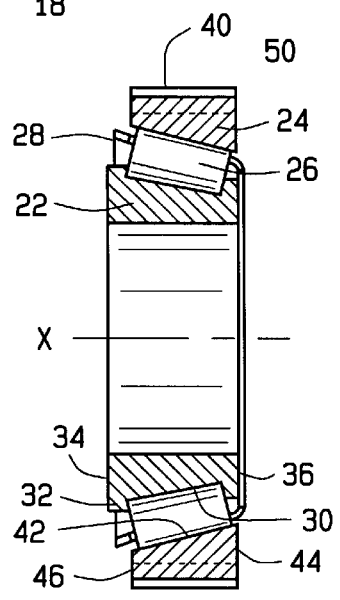
FIG. 2
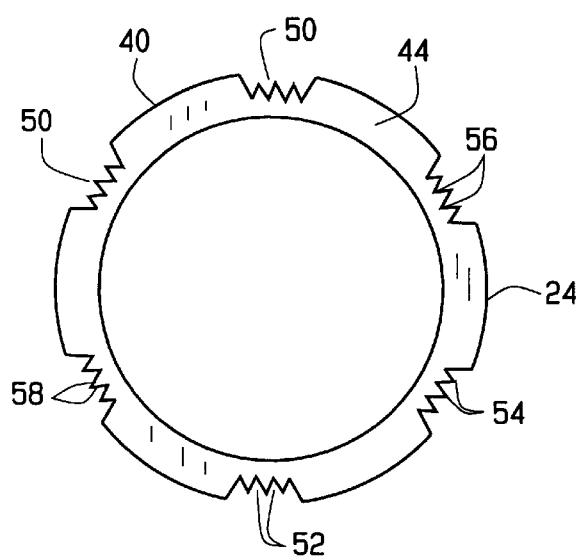
FIG. 1
FIG. 3

NOISE-REDUCING MACHINE COMPONENT

CROSS REFERENCE TO RELATED APPLICATION

Not applicable.

STATEMENT REGARDING FEDERALLY SPONSORED RESEARCH OF DEVELOPMENT

Not applicable.

BACKGROUND OF THE INVENTION

The present invention relates in general to noise reduction and more particularly to a machine component which reduces transmission of noise (vibrations) through it and to a bearing having the capacity to reduce noise.

Gear mechanisms and vehicular axle assemblies represent a major source of unwanted sound in industrial and automotive applications. In some industries, workers may suffer physical injury as a result of working near machinery which produces high levels of noise and vibration. In automotive applications, manufacturers are constantly looking for ways to reduce the interior sound level in the passenger compartments of their automobiles and trucks. In fact, low sound decibel readings in the interior of passenger cars have become important marketing issue for certain luxury automobiles.

In automotive gearboxes and axles, the attainment of lower audible noise levels can be limited by the inherent damping capacity of existing materials and components. For example, the advantage of using materials lighter than cast iron for transmission housings has not been fully exploited, because these lighter materials, such as aluminum and magnesium, have a lower damping capacity. Therefore, designers of these types of transmissions continue to look for ways of reducing the effect of gear noise that is transmitted along the shafts and through the bearings into the housings without compromising the stiffness of such systems.

A general review of the prior art in the field of noise reduction shows that virtually all the prior art depends upon the use of a resilient material to absorb vibration. This resilient material is usually positioned between the bearing and the bearing mounting device. But the resiliency of the materials detracts from the dimensional stability of the mountings. In the case of a transmission, this may result in less than optimum meshing of gears.

BRIEF SUMMARY OF THE INVENTION

The present invention resides in a machine component that contains a pocket bordered by reflecting surfaces which intersect at alternating peaks and valleys. Longitudinal noise waves propagating through the machine component, upon encountering the reflecting surfaces at the pocket, are partially converted into transverse waves, which are more easily attenuated in the material of the component. The machine component may take the form of a race for an antifriction bearing.

BRIEF DESCRIPTION OF THE SEVERAL VIEWS OF THE DRAWINGS

FIG. 1 is a perspective view, partially broken away and in section, of a gear shaft fitted to a housing with tapered roller bearings, with the bearings, gear and shaft having noise-reducing pockets formed in accordance with the present invention;

FIG. 2 is a sectional view of the tapered roller bearing with noise-reducing pockets in its cup;

FIG. 3 is an end view of the cup for the bearing of FIG. 2;

Corresponding reference characters indicate corresponding parts throughout the several views of the drawings.

DETAILED DESCRIPTION OF INVENTION

Figure 4:
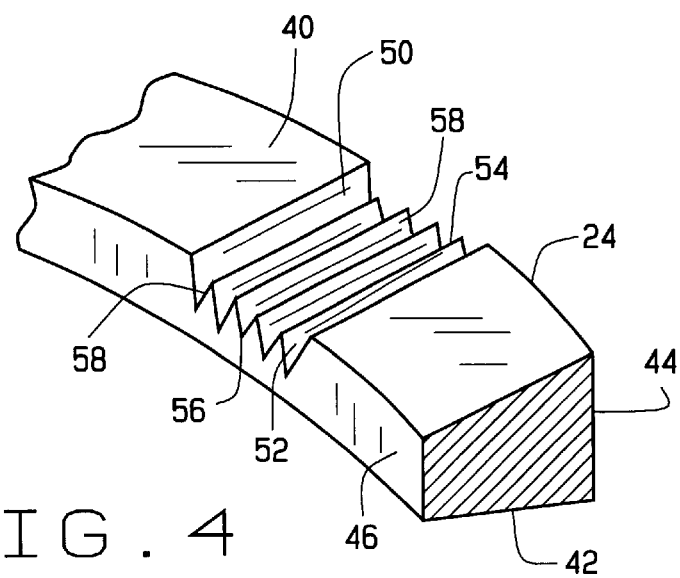
FIG. 4 is a fragmentary perspective view of the cup of FIG. 3.

Basically, a machine component that is in contact with a source of vibration, or for that matter generates vibrations itself, will transmit those vibrations to another component with which it is in contact. For example, a gear in a transmission, where it meshes with another gear, sets up internal vibrations and these vibrations are transferred to the shaft on which the gear is mounted. The vibrations travel along the shaft and through the bearings on which the shaft rotates to the transmission case in which the bearings are fitted. If the vibrations are within the frequency range detectable by the human ear, they may produce an annoying sound. But the vibrations, whether they be in the audible range or outside it, may match or closely approach the natural frequency of case, setting up resonant forces that could result in damage to that case. Or the vibrations may produce fretting along the surfaces where the components are in contact, and fretting will wear away the surfaces. Basically, the vibrations produce noise which may be sound if the vibrations are within the audible range, but may be outside the audible range as well, and the vibrations can have detrimental effects.

In any event, a solid material, when subjected to vibrations, experiences an oscillation of the particles from which the solid material is formed, so that within that material there exists a propagation of longitudinal and transverse mechanical waves. For longitudinal waves the direction of the particle oscillations is parallel to the direction of wave propagation. For transverse waves, the direction of the particle oscillations is perpendicular to the direction of wave propagation. Transverse waves are more easily attenuated in a solid material than are longitudinal waves. Moreover, longitudinal waves can experience amplification where favorable resonant conditions exist in the material. A mechanical wave, when it reaches the surface of the component in which it propagates, will pass through that surface and into an adjoining component, assuming that the two components are in contact along surfaces. The problem is particularly acute when the components are formed from materials, such as steel, which have good noise-transmitting characteristics.

To reduce the transmission of noise from one component to the other, the first component is provided with pockets having, on their borders that are presented toward the source of the noise, V-shaped grooves which provide reflecting surfaces that are oblique to the direction of wave propagation. Those surfaces form free boundaries in the component, and those boundaries face away from the direction of propagation of the incident waves. Longitudinal waves, upon encountering the free boundaries formed by the oblique surface areas at the grooves, are reflected and partially converted into transverse waves which attenuate in the first component in which the pockets are located and this reduces noise. The transverse waves in the mechanical wave likewise attenuate—indeed, to a good measure before reaching the pockets. To be sure, some of the longitudinal waves may pass through the first component where no pockets exist in it to intercept the waves and then into the other component, but even so, the magnitude of the transmission is significantly reduced. The pockets may open out of the peripheral surface of the first component which transmits the noise, that is out of the surface that is in contact with the other component, or they may be wholly internal of the first component that transmits the noise. But the free boundaries at the reflecting surfaces of the pockets should face away from the direction of the incident waves.

The invention finds utility in, among other devices, an antifriction bearing A (FIG. 1) that rigidly supports a shaft B in a housing C, and enables the shaft B to rotate about a fixed axis X. The bearing A retards the transmission of noise from the shaft B to the housing C. The housing C may be the casing of a transmission, with the shaft B being one of the gear shafts in the transmission. In this example, the gear on the shaft B, at teeth along its periphery, generates noise which travels along the shaft B and is transmitted through the bearing A to the housing C. The shaft B has a seat 12 and shoulder 14, whereas the housing C has a bore 16 and a shoulder 18 at one end of the bore 16. The bearing A fits over the seat 12 on the shaft B and into the bore 16 of the housing C.

The bearing A includes (FIG. 2) an inner race in the form of a cone 22, an outer race in the form of a cup 24, and rolling elements in the form of tapered rollers 26 arranged in a row between the cone 22 and cup 24. The cone 22, cup 24 and rollers 26 are all formed from bearing steel. The bearing A also includes a cage 28 which likewise fits between the cone 22 and cup 24 and contains pockets which receive the rollers 6 to maintain the proper spacing between the rollers 6.

The cone 22 fits snugly over the seat 12 on shaft B, preferably with an interference fit, and has a tapered raceway 30 that is presented away from the axis X. At the large end of the raceway 30, the cone 22 has a thrust rib 32 that leads out to a back face 34 which is squared off with respect to the axis X and is against the shoulder 14 at the end of the seat 12 on the shaft B. The cone 22 at its opposite end has a front face 36 that is likewise squared off with respect to the axis X and may or may not be against an abutment along the shaft B.

The cup 24 fits into the bore 16 of the housing C, preferably with an interference fit. It has an exterior surface 40 that is presented away from the axis X and is in contact with the surface of the bore 16. It also has a tapered raceway 42 that is presented inwardly toward the axis X and the raceway 30 of the cone 22 and is further inclined in the same direction as the cone raceway 30. Both the exterior surface 40 and the tapered raceway 42 extend between a back face 44 and a front face 46 which are squared off with respect to the axis X, with the former being against the shoulder 18 at the end of the bore 16 in the housing C.

The tapered rollers 26 lie in a row between the raceway 30 of the cone 22 and the raceway 42 of the cup 24 and contact those raceways 30 and 42 along their tapered side faces. At their large end faces they bear against the thrust rib 32, and indeed the thrust rib 32 prevents the rollers 26 from being expelled from the annular space between the two raceways 30 and 42.

Actually, the shaft B is supported on two bearings A, both very much alike, but the two bearings A are mounted in opposition and preferably set to a condition of preload. Assuming that the bearings A are manufactured with a good measure of precision, the axis X will remain stable, that is in a fixed position.

The shaft B may be subjected to mechanical vibrations and they create noise in the form of longitudinal and transverse mechanical waves. The noise travels along the shaft B and enters the cone 22 at the bearing seat 12. It passes radially through the cone 22 and at the raceway 30 enters the rollers 26 through which it likewise passes. The noise enters the cup 24 at the cup raceway 42 and passes radially through the cup 24 to the exterior surface 40. Since the exterior surface 40 is in snug contact with the surface of the bore 16 in the housing C, the noise passes from the cup 24 to the housing C, and while the housing C may be subjected to the noise, the noise is not very intense, inasmuch as the cup 24 attenuates, that is damps, much of the noise.

In this regard, the cup 24 contains several pockets 50 (FIGS. 3 & 4) which open out of its exterior surface 40, with the pockets 50 being spaced at circumferential intervals around the cup 24, preferably at equal circumferential intervals. The pockets 50 serve to attenuate the noise that passes from the rollers 26 into the cup 24, and to this end they should occupy as large a circumferential area as possible. Even so, they should not impair the ability of the bearing A to transfer radial loads between the shaft B and housing C, that is to say the exterior surface 40 must be large enough to maintain the cup 24 firmly in the bore 16 so that the axis X remains stable.

Each pocket 50 between its ends has side-by-side grooves 52 which form V-shaped valleys 56. Thus, along each pocket 50 lie reflecting surfaces 58 which are oblique to the exterior surface 40 where the exterior surface leads up to the pocket 50—and also oblique to the direction of propagation of mechanical waves that are directed at the pocket 50. The included angle between any oblique reflecting surfaces 58 that are adjacent across a valley 56 should range between 30° and 90°. The surfaces 58 on the left sides of the valleys 56 are essentially parallel to each other as are the surfaces on the right sides of the valleys 56. The peaks 54 lie below the cylindrical envelope formed by the exterior surface 40, so that they do not contact the surface of the bore 16 in the housing C. The reflecting surfaces 58 form a free boundary along the pocket 50, meaning that they lie along a medium that does not transmit mechanical waves well, if at all.

In the operation of the bearing A, noise within the shaft B passes through the cone 22 and rollers 26 and enters the cup 24 along the cup raceway 42. This noise passes generally radially through the cup 24 in all radial directions in the form of longitudinal and transverse mechanical waves, the former being more pronounced and intense. Some of the mechanical waves extend out to the exterior surface 40 where they enter the housing C at the interface between the exterior surface 40 and the surface of the housing bore 16. Other mechanical waves propagate out to the pockets 50. Here the longitudinal waves reflect from the oblique surfaces 58 and undergo a partial mode conversion, that is, they change to transverse waves which propagate in a different direction and dissipate their energy rapidly within the cup 24 itself.

Figure 5:
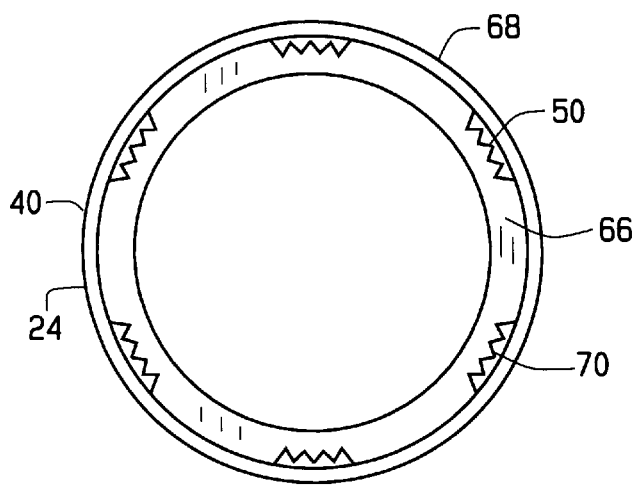
FIG. 5 is an end view of a modified cup.
Figure 6:
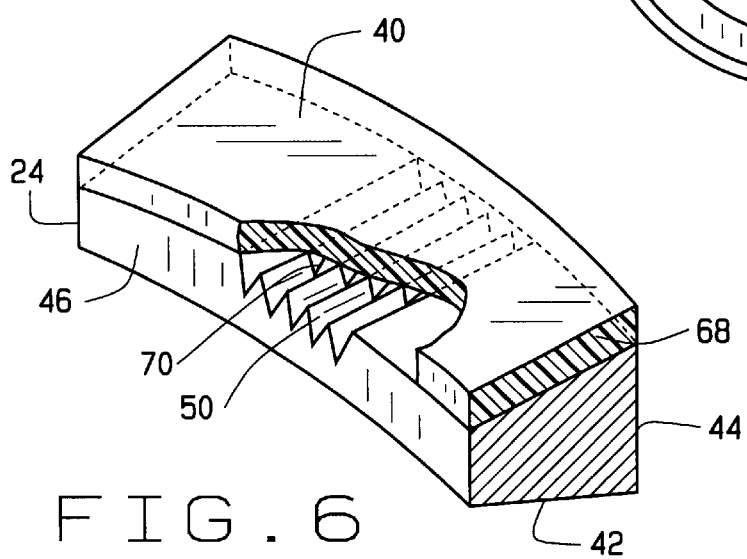
FIG. 6 is a perspective view, partially broken away and in section, of the modified cup of FIG. 5.

The cup 24 may also take the form of a composite including (FIGS. 5 & 6) a steel ring 66, which possesses the raceway 42 and contains the pockets 50, and a sleeve 68, which fits over the ring 66 and provides the exterior surface 40 that is against the surface of the bore 16 in the housing C, so that the sleeve 68 is interposed between the surface 16 and the pockets 50, with the peaks 54 being set inwardly from the sleeve 68 so that they do not contact the sleeve 68. The sleeve 68 is formed from a rigid polymer, such as a composite epoxy resin, and is preferably bonded to the ring 66. Indeed, it may be molded around the ring 66, and to prevent it from entering the pockets 50, the pockets 50 may be filled with a low acoustic impedance material 70, such as a foam. This prevents the hard material of the sleeve 68 from coming into contact with the oblique surfaces 58 and even the peaks 54 in the pockets 50, thus maintaining the free boundaries at the pockets 50.

Figure 7:
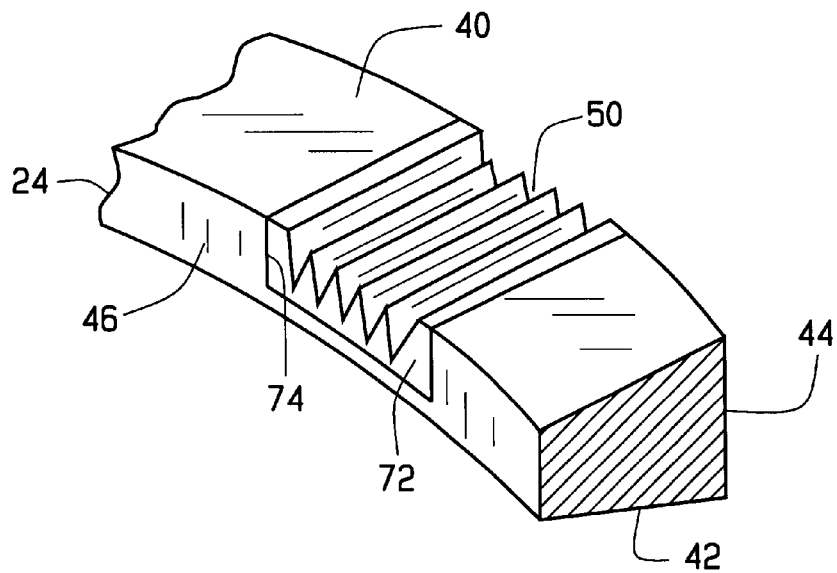
FIG. 7 is a fragmentary perspective view of another modified cup.

Instead of forming an integral part of the cup 24, the oblique surfaces 58 may be on inserts 72 (FIG. 7) that fit into cavities 74 of generally rectangular cross section in the cup 24.

Figure 8:
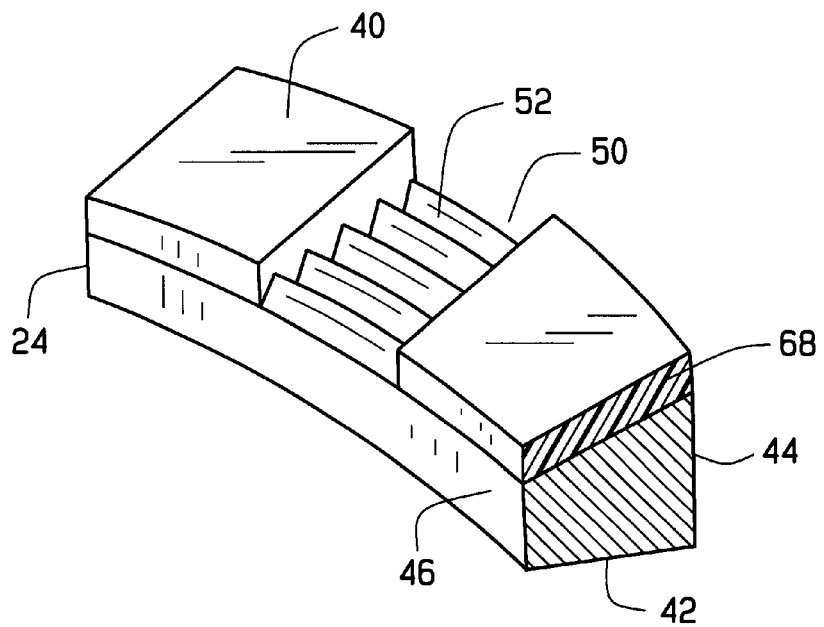
FIG. 8 is a fragmentary perspective view of still another modified cup.
Figure 9:
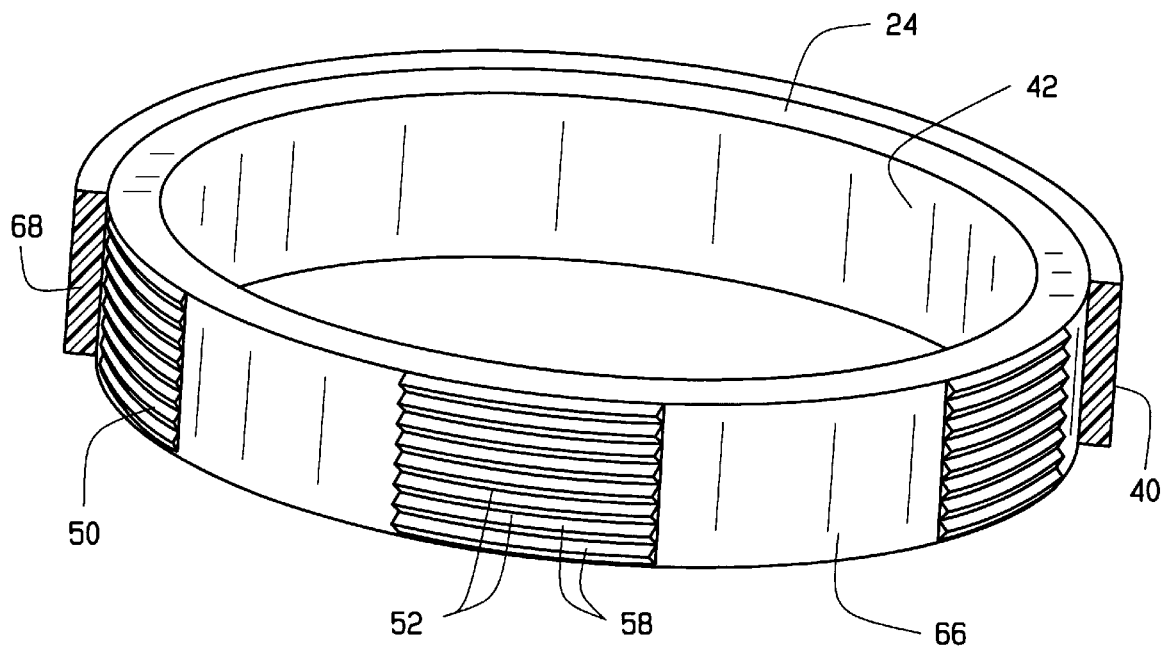
FIG. 9 is a perspective view of the modified cup of FIG. 8 partially broken away and in section.

The grooves 52 in the pockets 50 may extend circumferentially (FIGS. 8 & 9) instead of axially, or they may even assume a helical orientation anywhere between axial and circumferential. By the same token the insert 72 or a sleeve 68 or both may be utilized with circumferential or helical grooves 52.

The cup 24 transfers thrust loads to the housing C as well as radial loads, and these thrust loads are transferred across the interface formed by the back face 44 on the cup 24 and the shoulder 18 at the end of the bore 16 in the housing C. Noise will transfer across this interface as well, particularly when the thrust loading is heavy. But the cup 24 may contain pockets 50 which open out of its back face 44 and retard the transfer of noise to the housing C. The pockets 50 contain grooves 52 which may extend radially, circumferentially or spirally. By the same token, the cup 24, where it contacts another abutment along its front face 46, may have pockets 50 which open out of the front face 46.

Figure 10:
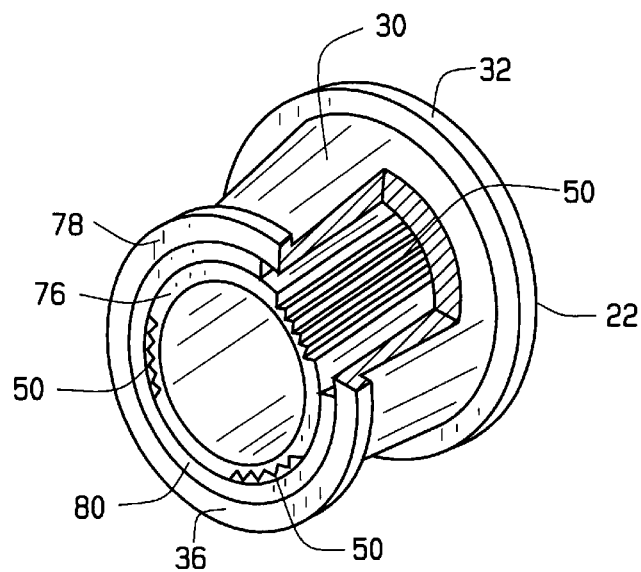
FIG. 10 is a perspective view, partially broken away and in section, of a cone for the bearing, with the cone containing noise-reducing pockets.

The reduction of noise that is derived from the shaft B may also occur within the cone 22 along with the cup 24, or in the cone 22 by itself (FIG. 10). To this end, the bore of the cone 22 lies within a steel sleeve 76 that fits within the remainder of the cone 22, that is, into a steel ring 78 along which the cone raceway 30 lies, preferably with a composite epoxy or other generally polymer layer 80 between the two. In any event, the steel sleeve 76 contains pockets 50 that open out of the exterior surface of the sleeve 76 away from the axis X, and the pockets 50 have grooves 52 that may extend axially, circumferentially or helically with the peaks 54 set inwardly from the layer 80.

Where the noise passes through the bearing A in the opposite direction, that is from the housing C to the shaft B, the cone 22 may be provided with pockets 50 that open into its bore 16 so that the free boundaries of the grooves 52 are presented toward the axis X. Similarly, the back face 34 of the cone 22 may have pockets 50 to reduce the transfer of noise through the shoulder 14 on the shaft B. Moreover, the transfer of noise inwardly may be diminished in the cup 24 by providing the cup 24 with a steel sleeve that surrounds the remainder of the cup 24, that is the portion having the raceway 42, with the sleeve having pockets 50 that open inwardly toward the axis X and are provided with V-shaped grooves 52.

The pockets 50 have utility in other types of antifriction bearings. For example, they may be used in ball bearings, including the angular contact variety, cylindrical roller bearings, spherical roller bearings and needle bearings. They even have utility in sleeve bearings, that is, bearings that do not contain rolling elements.

The reduction of noise may occur within the component that actually generates the noise and need not be along the surface where that component contacts another component. For example, a spur gear 84 (FIG. 1) fits over the shaft B with an interference fit. Here the gear 84 and the shaft B are in contact, so that noise will transfer from one to the other. The gear 84 along its periphery has teeth 86 which mesh with the teeth of another gear and produce vibrations which translate into noise that passes radially inwardly, in the form of longitudinal and transverse mechanical waves, from the teeth 86 to the shaft B. The gear 84 contains pockets 50 which extend axially through it and open out of its end faces, and the pockets 50 contain grooves 52 that have free boundaries facing toward the axis X. The pockets 50 intercept some of the mechanical waves, converting the longitudinal waves into transverse waves which are damped in the gear 84 itself.

On the other hand, the gear 84 may be provided with pockets 50 along its bore where it fits over the shaft B. The free boundaries of the oblique surfaces 58 of these pockets 50 face away from the teeth 84, which are the source of vibrations and noise. The pockets 50 intercept some of the mechanical waves directed radially toward the shaft B and reduce the transmission of noise into the shaft B.

Also, the shaft B, where the cones 22 of the bearings A fit over it, may be provided with pockets 50 (FIG. 1) which open away from the axis X, so that the oblique surfaces 58 are presented toward the cone 22. The pockets 50 intercept waves transmitted through the shaft B and partially convert them into transverse waves which attenuate in the shaft B.

Generally speaking, the oblique surfaces in the pockets 50, wherever the pockets 50 may be located, have free boundaries, that is to say, they are surfaces along which exists air or at the most a material, such as a foam, which has a low acoustic impedance. The surfaces 58 at the free boundaries should face away from the direction of incident mechanical waves that originate from the source of the noise.

| NOISE-REDUCING MACHINE COMPONENT | |
|---|---|
| A | bearing |
| B | shaft |
| C | housing |
| X | axis |
| 2 | surface |
| 4 | surface |
| 6 | pockets |
| 8 | grooves |
| 10 | |
| 12 | seat |
| 14 | shoulder |
| 16 | bore |
| 18 | shoulder |
| 22 | cone |
| 24 | cup |
| 26 | tapered rollers |
| 28 | cage |
| 30 | tapered raceway |
| 32 | thrust rib |
| 34 | back face |
| 36 | front face |
| 40 | exterior surface |
| 42 | raceway |
| 44 | back face |
| 46 | front face |
| 50 | pockets |
| 52 | grooves |
| 54 | peaks |
| 56 | valleys |
| 58 | oblique surfaces |
| 62 | |
| 66 | ring |
| 68 | sleeve |
| 70 | low impedance meter |
| 72 | inserts |
| 74 | cavities |
| 76 | steel sleeve |
| 78 | ring |
| 80 | polymer layer |

-continued

NOISE-REDUCING MACHINE COMPONENT

| 84 | spur gear |
|---|---|
| 86 | teeth |

What is claimed is:

1. The combination comprising: first and second machine components having first and second surfaces which are in contact at an interface between the machine components, the first machine component containing at least one pocket having a free boundary which is formed by a plurality of intersecting reflecting surfaces that create V-shaped grooves, whereby longitudinal waves produced by vibrations in the first component behind the free boundary of the pocket formed by the V-shaped grooves, upon encountering the reflecting surfaces of the pocket, will convert partially into transverse waves.

2. The combination according to claim 1 wherein the pocket opens out of the first surface.

3. The combination according to claim 1 wherein the V-shaped grooves have V-shaped valleys and are separated by V-shaped peaks, and the reflecting surfaces connect the peaks and valleys.

4. The combination according to claim 3 wherein the included angle at the valleys of the grooves is between 30° and 90°.

5. The combination according to claim 3 wherein the pockets contain a low acoustic impedance material.

6. The combination comprising: a first machine component having a first surface and a second machine component that has a second surface in contact with the first surface of the first machine component, the second machine component being subjected to vibrations which cause longitudinal mechanical waves to propagate within it, the second machine component containing a pocket that is defined in part by reflecting surfaces which intersect to form a succession of alternating peaks and valleys which lie in the path of at least some of the longitudinal waves and have a free boundary, so that the longitudinal waves, upon encountering the reflecting surfaces, transform into transverse waves which attenuate in the second component, whereby noise is reduced.

7. The combination according to claim 6 wherein the included angle between adjacent reflecting surfaces at the valleys is between 30° and 90°.

8. The combination according to claim 6 wherein the pocket opens out of the second surface.

9. A noise reducing bearing for facilitating rotation about an axis, said bearing comprising: a first race having a first raceway that surrounds the axis; a second race having a second raceway that surrounds the axis and is presented toward the first raceway; and rolling elements organized in a row between the first and second races and being in contact with the raceways, the second race containing a pocket, the boundary of which is free and is defined by reflecting surfaces which intersect at alternating peaks and valleys, whereby noise which is transmitted through the second race as longitudinal waves directed toward the pocket is reduced, in that the longitudinal waves, upon encountering the reflecting surfaces at the pocket, are transformed at least partially into transverse waves which attenuate in the second race.

10. A bearing according to claim 9 wherein the second race has a remote surface that is spaced from the second raceway.

11. A bearing according to claim 10 wherein the pocket opens out of the remote surface.

12. A bearing according to claim 11 wherein the peaks are set inwardly from the remote surface.

13. A bearing according to claim 11 wherein the second race includes a steel ring on which the second raceway is located and a sleeve surrounding the ring and extending across the pocket, but not contacting the peaks.

14. A bearing according to claim 13 wherein the sleeve is formed from a polymer.

15. A bearing according to claim 9 wherein the reflecting surfaces are on an insert that is fitted into the second race at the pocket.

16. A bearing according to claim 9 wherein the pockets are filled with a solid material having an acoustic impedance that is substantially less than the acoustic impedance of the remainder of the second race, so that the waves do not pass easily through the material.

17. A bearing according to claim 9 wherein the races are concentric about the axis with one surrounding the other; wherein the raceways are oblique to the axis; wherein each race has a back face through which thrust loads are transferred into the bearing; and wherein the pocket opens out of the back face of at least one of the races.

18. A bearing according to claim 9 wherein the races are concentric about an axis of rotation, with the second race being inside the first race; wherein the second race contains a bore and also contains the pocket, with the pocket being between the bore and the second raceway.

19. A bearing according to claim 18 wherein the second race includes inner and outer steel components, with the pockets being in the inner component and the second raceway being on the outer component.

20. A bearing according to claim 19 wherein the second race also includes a polymer sleeve interposed between the inner and outer steel components.

21. A bearing according to claim 9 wherein valleys form grooves which extend axially in the second race.

22. A bearing according to claim 9 wherein the valleys form grooves which extend circumferentially in the second race.

23. A bearing according to claim 9 wherein the valleys form grooves which extends obliquely with respect to the axis.

24. A machine component that is subjected to vibrations at a source of noise in the component, said machine component containing a pocket having a free boundary that is presented toward the source of the vibrations, with the free boundary being formed by a plurality of reflecting surfaces that intersect at V-shaped peaks and valleys and are organized oblique to direction propagation of longitudinal waves produced by the vibrations, whereby the longitudinal waves upon encountering the reflecting surfaces partially convert into transverse waves which attenuate in the machine component and thus reduce noise in the component.

25. A machine component according to claim 24 wherein the machine component is formed from steel.

* * * * *